Patented July 2, 1935

2,007,108

UNITED STATES PATENT OFFICE 2,007,108

MEDICINAL PREPARATION

Harry Bresnick, New York, N. Y.

No Drawing. Application October 8, 1934,
Serial No. 747,477

8 Claims. (Cl. 167—81)

This invention relates to the production of a new medicinal preparation containing fish-liver oils of high vitamin content in which the nauseous and objectionable odor and taste of these oils are effectively masked, and which preparation remains stable over a long period of time. The invention furthermore embraces a novel process of producing the new medicinal preparation.

This application is a continuation-in-part of my application Serial No. 710,109, filed February 7, 1934.

Medical science has acknowledged for a long period of time the dietary values of vitamins, and particularly the curative and prophylactic characteristics of the vitamin A. Until recently, the cod fish was known to be the richest source of vitamin A, this fish having the peculiar ability to concentrate this vitamin in its liver oil. In recent times, it was discovered that the halibut surpassed the cod as a source of vitamin A, and that the liver oil of the former was from 100 to 200 times as rich in vitamin A as that of the latter.

In the development of vitamins in the field of medical science, cod-liver oil had been treated to concentrate the vitamins A and D found therein, and these concentrated sources of vitamins were embodied in capsule or tablet form. This mode of obtaining the desired vitamins proved more palatable than the taking of natural cod-liver oil. However, since these vitamins seem to be associated preponderantly with fats in nature, there appeared to be a heavy loss in potency and activity of these concentrates unless they were accompanied by fats. For this reason, natural cod-liver oil was generally prescribed, so that no loss would take place in the digestive absorption of the needed vitamins.

The discovery of a concentrated source of vitamin D in a solution of irradiated ergosterol in oil made possible the control of this vitamin in diets. This was particularly simple in view of the stability of the above solution which rendered it adaptable to be incorporated in various dosages in canned foods, milk, bread, and other foodstuffs. Although halibut-liver oil is as much as 200 times stronger in its vitamin A content than cod-liver oil, the former is only several times greater in its vitamin D content than the latter. The addition of irradiated ergosterol in oil to vitamin sources supplies the vitamin D content in any desired proportions. Although the vitamin D content remains fixed in concentrated vitamin sources derived from the fish-liver oils, this is not the case with the vitamin A content, which is readily subject to oxidation and deterioration.

It is the object of the invention to overcome the above deficiencies, that is, to provide a palatable and readily digestible medicinal preparation having the desired vitamin content in which suitable fats are re-introduced in combination with the vitamins to render the compound easily digestible and to effectively preserve the fish oil with its vitamin A potency for a long period of time.

The use of fish-liver oils of high vitamin content presents many other difficulties. In view of the nauseous and objectionable taste of these oils, great difficulty is experienced in administering them, especially to infants and children. In the attempt to make these oils, particularly halibut-liver oil, more pleasant in appearance, the oil is refined to impart a light attractive color thereto, and thereby a great portion of its therapeutic effect is sacrificed. Furthermore, these oils are fed to children in minute dosages, and, for instance, when a three minim dose is fed to a child on a spoon, or in a bottle with a nipple, or in a glass, it is impossible to know accurately the amount of the oil taken by the child, since some of the fat adheres to the glass or spoon.

Another difficulty attending the keeping of the fish-liver oils is the separation of the heavier stearine which forms a small percentage of these oils, this stearine falling and adhering to the bottom of the vessels containing the oils. A substantial portion of the vitamin and other therapeutic value of the fish-liver oils is contributed by these stearines. A simple shaking of the vessel without heating is not effective in placing the component fats in solution, and thereby the medicinal effect of the oils is diminished.

It is the object of the instant invention to overcome all of the above mentioned difficulties. By embodying suitable masking ingredients with the preparation containing a hard fat in combination with the fish-liver oils, it is possible to hide completely the taste and odor of the latter. I have found that the addition of suitable flavoring and sweetening ingredients to the mixture of the fish-liver oils bound in the hard fat renders the composition highly palatable and capable of easy feeding to children. Furthermore, since the final product in accordance with the invention is a solid in the nature of a confection, the color of the fish-liver oils which are originally embodied in the composition is immaterial and the crude halibut-liver or other fish-liver oil may be used, with its full strength vitamin content. The incorporation of specific quantities of the fish-liver oil in the mixture in which the amounts of the other ingredients are fixed, and the subdivision of the complete mass into a predetermind number of units, serve to determine accurately the individual dosages of the fish-liver oil. Also, the homogeneous character of the product according to the invention assures a uniform dispersion of all of the constituents of the fish-liver oils as well as of all of the other ingredients. Thus, no separation of stearine from the other constituents of the fish-liver oils takes place.

It is a further object of the invention to produce a new concentrated medicinal composition of matter containing fish-liver oils, which preserves indefinitely the therapeutic properties of these oils, and which prevents the rancidity thereof. In the composition, according to the invention, the fish oil is preserved for a long period of time without deterioration and with no diminution of the vitamin A potency.

I have found that a substantially anhydrous composition of a vegetable fat such as cocoa butter with fish-liver oils keeps for a long time without deterioration and with no loss of the vitamin content, particularly vitamin A, which is oxidizable. Although I have met with partial success by using different dehydrated vegetable fats, I have found that cocoa butter is the most suitable, and that results nearly as satisfactory may be obtained by the use of palm-kernel or coconut stearines. In order to render the composition stable, I have found that the moisture content thereof should be maintained at a minimum. An upper limit of ½% of moisture based upon the complete mass of the composition produces a highly stable and satisfactory product. A smaller moisture content results in even more stable product. Although the moisture content may exceed ½% without sacrificing the full advantages of the invention, I have found that a moisture content of more than 1 and ½% renders the composition unstable within a comparatively short period of time, which renders it impractical from a commercial viewpoint.

Although the combining of the vegetable fat in the form of cocoa butter with the fish-liver oils in such a manner that the composition is substantially anhydrous, whereby the fish-liver oils are effectively preserved against deterioration, results in a useful product, the full utility thereof as a medicinal preparation is not realized until one or more masking ingredients are added to hide the objectionable taste and odor of the fish-liver oils. I have found that a sweetening in combination with a flavoring are most satisfactory for this purpose.

Since the product according to the invention is limited in its moisture content, the most practical form of sweetening is sucrose. The sweetening should be preferably crystallizable. However resort may be had to any known sweetening, and I have used cane-sugar with complete success.

Any desired flavoring may be employed, preference being shown to flavorings having the least moisture and which in themselves are fairly stable, such as spices, barks, powdered and essential flavorings. Cocoa and a terpeneless orange oil in combination are excellent as flavorings. The cocoa of the Arriba type is preferable of an amount about 15% of the total weight of the homogeneous mass. Six minims of the terpeneless orange oil per pound of the finished product is adequate, this ingredient furthermore possessing in itself advantageous therapeutic properties. Also, any other stable dry medications may be added, as well as milk fats and solids. I have found grain honey a satisfactory flavoring.

Another ingredient which may be added to the composition of vegetable fat with fish-liver oils, with or without the sweetening and flavoring ingredients, to produce an improved composition is lecithin. A slight amount of this product, about ½% of the finished mass, is effective as a binder for the fish-liver oils of lighter specific gravity with the heavier oils and fats in the cocoa butter or other hard fats. The lecithin furthermore tends to retard the hydrolysis of fats and prevents the formation of free fatty acids, and it also aids in the digestive processes in the oxidation of the fatty acids.

The product according to the invention is prepared in the following manner:

The vegetable fat such as cocoa butter, the sweetening and the flavoring are combined in suitable proportions, specific examples of which are set forth below, and are continuously agitated in a conching machine in a dry hot room until a moisture test of the batch indicates a moisture content at least in no great excess of ½%, although reasonably satisfactory results may be obtained with an upper limit of the moisture content in the vicinity of one and one-half percent. Thereupon the batch is gradually cooled to about 100° F. The fish-liver oil or oils may then be added to the batch and thoroughly stirred therein to form one homogeneous substantially anhydrous mass. If lecithin forms a part of the composition, it is first mixed with the fish-liver oils and the resulting mixture is added to the batch of other ingredients.

This entire mixing process may be conducted in vacuo.

As soon as possible after the thorough incorporation of the fish-liver oils, with or without lecithin, in the mass, the temperature thereof is reduced to about 84° F., and poured into molds. The molds are placed in a dry atmosphere at a temperature of about 50° F. until the molds are set. I prefer, for the final physical form of the product, small square tablets, about 180 to the pound, each wrapped in tin foil. It is also commercially practical to mold the product in squares, 12 or more to a block, with deep shoulders between the squares so that the individual squares may be broken off easily, the whole block also being wrapped in tin foil. Each square is designed to contain a therapeutic dosage. Of course any number of other forms of the product are practical commercially; the composition in its plastic state incorporating a high percentage of fish-liver oils may be formed into balls and coated or placed in capsules.

The atmosphere in which all operations are conducted should be dry to prevent excessive moisture being absorbed by the mass; however I do not confine myself to a specific humidity so long as the complete operation can be conducted within the moisture range suggested.

While one may combine cocoa butter with sucrose and a flavoring and with slight heat form a solid mass, there is a decided advantage in long "conching" of the cocoa butter and sucrose, since the smaller the sucrose crystals, the more cocoa butter may properly be added. Also conching for a lengthy period in a dry warm atmosphere diminishes the moisture content of the mass. While the ingredients I prefer may actually only require 25% of cocoa butter, I much prefer about 40%, as this enables the use of a larger percentage of fish-liver oil with safety; and a higher percentage of cocoa butter to the total mass makes for a firmer, more homogeneous mass.

About 7% of fish-liver oils calculated upon the weight of the finished mass may be incorporated in the composition without any difficulty being encountered in the masking of the odor and the taste thereof by the masking ingredients. Such a proportion of fish-liver oils also results in a stable composition for a long period of time. I have found that amounts of fish-liver oils higher than 10% render the masking thereof difficult by the sweetening and flavoring ingredients mentioned above. A highly practical composition is formed by a mixture of 35–40% vegetable fat such as cocoa butter, 15% flavoring, 40% sweetening and 10–5% fish-liver oils. These percentages may be varied in accordance with the different strengths of the ingredients which enter into the composition.

Having described my invention, what I claim is:

1. The process of preparing a concentrated medicinal composition which comprises thoroughly admixing and substantially dehydrating a vegetable fat, a flavoring, and a sweetening in the presence of heat in a dry atmosphere to the extent that the moisture content thereof is substantially no greater than one and one-half percent of the finished mass, incorporating fish-liver oil in said admixture to form a homogeneous mass, and permitting said mass to cool and solidify.

2. The process of preparing a concentrated medicinal composition which comprises heating and thoroughly admixing cocoa butter, a flavoring and a sweetening, substantially dehydrating said admixture to the extent that the moisture content thereof is substantially no greater than one and one-half percent of the finished mass, incorporating fish-liver oil in said admixture to form a homogeneous mass, and permitting said mass to cool and solidify, all of said steps being carried out in a dry atmosphere.

3. A substantially anhydrous edible medicinal preparation comprising an intimate mixture of an edible dehydrated hard vegetable fat and a fatty material having a high vitamin content subject to deterioration, said mixture having a moisture content substantially no greater than one and one-half percent of the mass.

4. A substantially anhydrous edible medicinal preparation comprising an intimate mixture of cocoa-butter and fish-liver oil having a high vitamin content subject to deterioration, said mixture having a moisture content substantially no greater than one and one-half percent of the mass.

5. A substantially anhydrous edible medicinal preparation comprising an intimate mixture of an edible dehydrated hard vegetable fat, a fatty material having a high vitamin content subject to deterioration and lecithin, said mixture having a moisture content substantially no greater than one and one-half percent of the mass.

6. A substantially anhydrous edible medicinal preparation comprising an intimate mixture of an edible dehydrated hard vegetable fat, fish-liver oil having a high vitamin content subject to deterioration and at least one additional ingredient for masking the taste and odor of the fish-liver oil, said mixture having a moisture content substantially no greater than one and one-half percent of the mass.

7. A substantially anhydrous edible medicinal preparation comprising an intimate mixture of an edible dehydrated hard vegetable fat, fish-liver oil having a high vitamin content subject to deterioration, a sweetening and a flavoring, said mixture having a moisture content substantially no greater than one and one-half percent of the mass.

8. A substantially anhydrous edible medicinal preparation comprising an intimate mixture of cocoa-butter, fish-liver oil having a high vitamin content subject to deterioration, cocoa and a sweetening, said mixture having a moisture content substantially no greater than one and one-half percent of the mass.

HARRY BRESNICK.